United States Patent
Chang et al.

(10) Patent No.: US 9,833,029 B2
(45) Date of Patent: Dec. 5, 2017

(54) METHOD OF FORMING THREE-DIMENSIONAL ELECTRONIC MANNEQUIN

(71) Applicants: Li-Ching Chang, New Taipei (TW); Mei-Yeh Chang, New Taipei (TW)

(72) Inventors: Li-Ching Chang, New Taipei (TW); Mei-Yeh Chang, New Taipei (TW)

(*) Notice: Subject to any disclaimer, the term of this patent is extended or adjusted under 35 U.S.C. 154(b) by 0 days.

(21) Appl. No.: 15/181,432

(22) Filed: Jun. 14, 2016

(65) Prior Publication Data
US 2017/0224039 A1    Aug. 10, 2017

(30) Foreign Application Priority Data
Feb. 5, 2016 (TW) .............................. 105104104 A

(51) Int. Cl.
*G06T 15/00* (2011.01)
*A41H 3/00* (2006.01)
*G06T 17/00* (2006.01)

(52) U.S. Cl.
CPC ............. *A41H 3/007* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 6,445,387 B1* | 9/2002 | Choi ....................... | G06T 19/00 345/419 |
| 6,968,075 B1* | 11/2005 | Chang ................ | G06K 9/00214 382/111 |
| 8,922,547 B2* | 12/2014 | Lim ...................... | G06T 15/205 345/419 |
| 2003/0011590 A1* | 1/2003 | Kung ..................... | G06T 17/00 345/419 |
| 2009/0175540 A1* | 7/2009 | Dariush ............. | G06K 9/00362 382/195 |

(Continued)

FOREIGN PATENT DOCUMENTS

| | | |
|---|---|---|
| TW | I315042 B | 9/2009 |
| TW | 201439800 A | 10/2014 |
| TW | I488071 B | 6/2015 |

OTHER PUBLICATIONS

Juang et al., Computer Vision-Based Human Body Segmentation and Posture Estimation, Jan. 2009, IEEE Transactions on System, Man, and Cybernetics, vol. 39, No. 1, pp. 119-133.*

(Continued)

*Primary Examiner* — Anh-Tuan V Nguyen
(74) *Attorney, Agent, or Firm* — CKC & Partners Co., Ltd.

(57) ABSTRACT

A method of forming a three-dimensional electronic mannequin includes the following steps. First, measured data are provided. Subsequently, mannequin central axes are calculated. Inclination angle of the central axes are also calculated. A plurality of coordinate values of each human circumference line are calculated. At least one human orientation parameter of the three-dimensional electronic mannequin is adjusted. The adjusted three-dimensional electronic mannequin is displayed. The human orientation parameter includes a central axis of the neck part, a central axis of the side neck armpit part, a central axis of the armpit waist part and a central axis of the waist gluteal fold part.

7 Claims, 5 Drawing Sheets

(56) References Cited

U.S. PATENT DOCUMENTS

2011/0172562 A1* 7/2011 Sahasrabudhe ...... A61B 5/0476
   600/587
2016/0245726 A1* 8/2016 Nishigaki ........... G01M 99/001

OTHER PUBLICATIONS

Jiang et al., Modeling Human Body for Virtual Try-On System, 2009, IEEE Global Congress on Intelligent Systems, pp. 441-446.*

* cited by examiner

METHOD OF FORMING THREE-DIMENSIONAL ELECTRONIC MANNEQUIN

RELATED APPLICATIONS

This application claims priority to Taiwan Patent Application Serial Number 105104104, filed Feb. 5, 2016, which is herein incorporated by reference.

TECHNICAL FIELD

The present disclosure generally relates to a method of forming a three-dimensional electronic mannequin. More particularly, the present disclosure relates to a method of forming an attitude changeable three-dimensional electronic mannequin.

BACKGROUND

In recent years, with the rapid development of science and technology, all trades and professions follow the technological development towards automatic production and design to increase productivity and reduce costs so as to establish an unshakable position in their industry. Recently, with advances in technology, the computer-aided clothing pattern construction is also gradually used for the garment industry to rapidly increase the speed of product innovation.

The clothing pattern construction plays a key role in the clothing style, and a three-dimensional mannequin plays a key role in the clothing pattern construction. However, in the current garment industry, a three-dimensional electronic mannequin subjects to certain limitations. The main reason is the conventional three-dimensional electronic mannequin for the garment industry cannot provide required information correctly. The three-dimensional electronic mannequin established by the electronic scanning data cannot effectively provide the garment industry designer to properly evaluate the final result of their designed clothing.

Currently, the three-dimensional electronic mannequin may not provide a complete and enough change while the ratio of weight to height of the model is changed. Especially, when making stature adjustments, the three-dimensional electronic mannequin may not show an appropriate result. Therefore, there is a need to improve the three-dimensional electronic mannequin to assist garment industry for improving efficiency thereof.

SUMMARY

One objective of the embodiments of the present invention is to provide a method of forming a three-dimensional electronic mannequin.

To achieve these and other advantages and in accordance with the objective of the embodiments of the present invention, as the embodiment broadly describes herein, the embodiments of the present invention provides a method of forming a three-dimensional electronic mannequin including the steps of providing measured data, calculating mannequin central axes, calculating inclination angles of the mannequin central axes, calculating coordinate values of a plurality of points on circumference lines, adjusting at least one human orientation parameter of the three-dimensional electronic mannequin to form an adjusted three-dimensional electronic mannequin, and displaying the adjusted three-dimensional electronic mannequin on an electronic display.

The step of calculating mannequin central axes includes steps of calculating a central axis of a neck part, calculating a central axis of a side neck armpit part, a central axis of an armpit waist part, and a central axis of a waist gluteal fold part.

In one embodiment, the step of calculating inclination angles of the mannequin central axes includes steps of calculating an inclination angle of the central axis of the neck part, calculating an inclination angle of the central axis of the side neck armpit part, an inclination angle of the central axis of the armpit waist part, and an inclination angle of the central axis of the waist gluteal fold part.

In one embodiment, the inclination angle of the central axis of the neck part is an inclination angle between the Y axis and an angular bisector of a line connecting a back neck top point and a back neck point and a line connecting a front neck top point and a front neck concave point. The inclination angle of the central axis of the neck part is $\theta_4$, $$\theta_4 = \frac{1}{2}(\sin^{-1}(/N1\_Z\_B - SNA1\_Z\_B/ / C_{SNA1'\_BN1'\_B\_YZ}) + \sin^{-1}(/N2\_Z\_F - SNA4\_Z\_F/ / C_{SNA4'\_FN2'\_F\_YZ}))$$

wherein the N1_Z_B is a coordinate value on Z-axis of the back neck top point, the SNA1_Z_B is a coordinate value on Z-axis of the back neck point, the $C_{SNA1'\_BN1'\_B\_YZ}$ is a straight line distances of the back neck top point and the back neck point on YZ plane, the N2_Z_F is a coordinate value on Z-axis of the front neck top point, the SNA4_Z_F is a coordinate value on Z-axis of the front neck concave point, and the $C_{SNA4'\_FN2'\_YZ}$ is a straight line distances of the front neck top point and the front neck concave point on YZ plane.

In one embodiment, the inclination angle of the central axis of the side neck armpit part is $\theta_3$, $$\theta_3 = \sin^{-1}(|N4\_Z\_L - SNA14\_Z\_L|/C_{SNA14'\_LN4'\_L\_YZ})$$

wherein the N4_Z_L is a coordinate value on Z-axis of the left neck point, the SNA14_Z_L is a coordinate value on Z-axis of the left armpit point, and the $C_{SNA14'\_LN4'\_L\_YZ}$ is a straight line distances of the left neck point and the left armpit point on YZ plane.

In one embodiment, the inclination angle of the central axis of the armpit waist part is $\theta_1$, $$\theta_1 = \sin^{-1}(|SNA14\_Z\_L|/C_{SNA14'\_L\_YZ})$$

wherein the SNA14_Z_L is a coordinate value on Z-axis of the left armpit point, and the $C_{SNA14'\_L\_YZ}$ is a straight line distances of the left armpit point and the left waist point on YZ plane.

In one embodiment, the inclination angle of the central axis of the central axis of the waist gluteal fold part is $\theta_2$, $$\theta_2 = \sin^{-1}(|WGF8\_Z\_L|/C_{WGF8'\_L\_YZ})$$

wherein the WGF8_Z_L is a coordinate value on Z-axis of the left ankle side point, and the $C_{WGF8'\_L\_YZ}$ is a straight line distances of the left ankle side point and the left waist point on YZ plane.

In one embodiment, the step of calculating coordinate values of a plurality of points on circumference lines includes dividing each circumference line into 32 points with an equal angle interval on the circumference line.

In one embodiment, the step of adjusting at least one human orientation parameter of the three-dimensional electronic mannequin to form an adjusted three-dimensional electronic mannequin includes adjusting at least one of the inclination angles of the mannequin central axes, a height, a thickness, a width and a sectional circumference of the three-dimensional electronic mannequin.

Hence, the method of forming the three-dimensional electronic mannequin according to the present invention can quickly change the postures of the three-dimensional electronic mannequin by changing at least one human orientation parameter so that the designer of the garment industry can effectively make clothing pattern construction. In addition, modifying the inclination angles of the four human parts can quickly adjust the posture of the three-dimensional electronic mannequin without too much data input and allow the three-dimensional electronic mannequin more close to a real human and improve the variation and practicability thereof.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Figure 1:
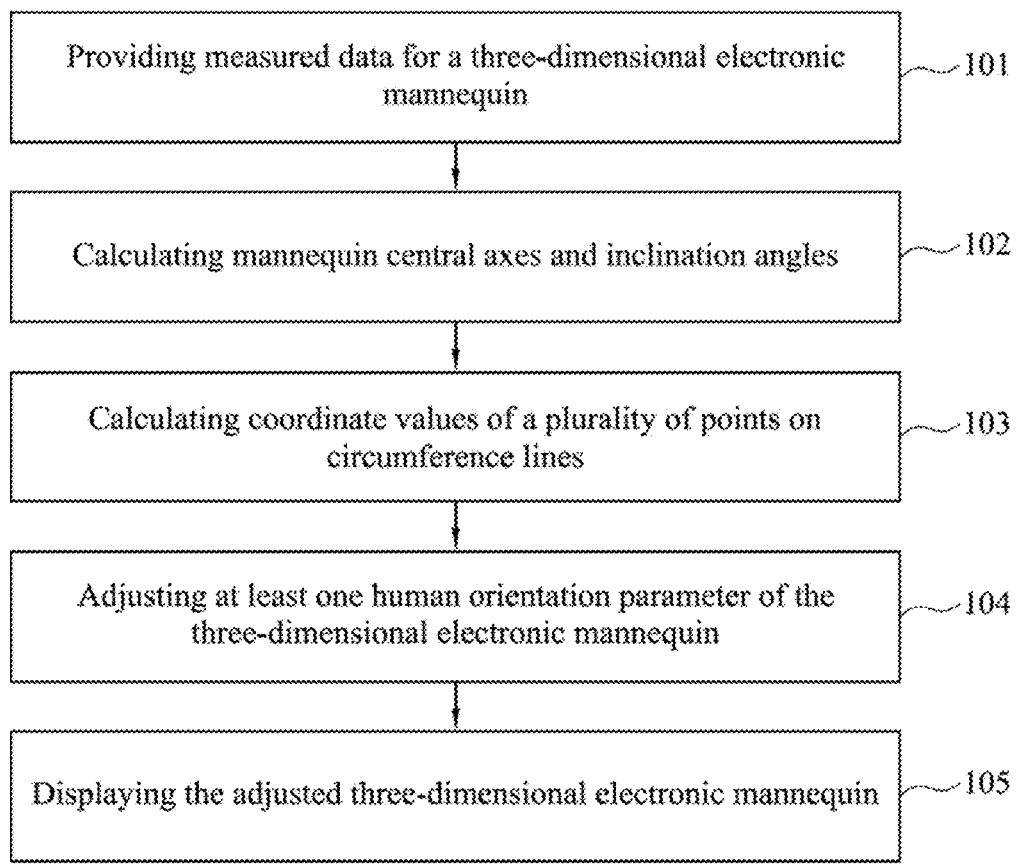
FIG. 1 illustrates a flowchart of a method of forming a three-dimensional electronic mannequin according to an embodiment of the present invention.

FIG. 1 illustrates a flowchart of a method of forming a three-dimensional electronic mannequin according to an embodiment of the present invention. The three-dimensional electronic mannequin according to the present invention mainly demonstrates a neck part and a body part to provide the clothing designer making clothes sewing patterns and designs. In addition, the three-dimensional electronic mannequin according to the present invention can adjust the human orientation parameters, e.g. angle, height, thickness, width, and sectional circumference line of the three-dimensional electronic mannequin, according to the customer's requirement to provide different postures and body style for the three-dimensional electronic mannequin. Because the method of forming a three-dimensional electronic mannequin according to the present invention adopts the clothing design as a design starting point and combine the required data of the sectional circumference, the three-dimensional electronic mannequin according to the present invention can effectively increase the accuracy of the mannequin and reduce the data storage requirement compared with a conventional three-dimensional electronic mannequin. Furthermore, since the three-dimensional electronic mannequin according to the present invention can modify the human orientation parameters according to each customer's requirement and difference, the three-dimensional electronic mannequin according to the present invention can satisfy not only the clothing mass production but also the customized clothing store to adjust the three-dimensional electronic mannequin according to the requirements of the personal customer. The adjusted three-dimensional electronic mannequin can effectively improve clothing pattern construction so that the clothing can be made better and show the clothing style and wearing effect on the computer display.

To clearly explain the method of forming a three-dimensional description of the electronic mannequin according to the present invention, the measuring points of a human body is described as follows.

A human body includes the shoulder part, chest part, dorsum part, breast part, waist part, abdomen part and hip part. The main pillar of the human body is the vertebra. On a side view of the human body, the vertebra is S-shaped, when a human stand on the ground, each human part thereof is non-perpendicular to the ground, actually the human parts show a slightly forward or backward tilt.

The vertebra includes the cervical vertebra, thoracic vertebra and lumbar vertebra. An important turning point of the vertebra is the junction of the cervical vertebra and the thoracic vertebra. A large inclination angle of the human body is at the neck, therefore side neck point is one of the body contour measuring items. The side neck point is an intersection of the side portion of the neck part and the shoulder ridge line, and the side neck point can divide the body to into a front portion and a rear portion. Therefore, the side neck point is a measuring point for the mannequin. In addition, a portion of the vertebra under the neck is S-typed. The raised points are respectively, at thoracic curvature of the thoracic vertebra and the lumbra curvature of the lumbra vertebra, which closely match to the bottom armpit point and the waist circumference line. Therefore, the three-dimensional electronic mannequin according to the present invention is divided into four human parts, the neck part referred to as N, the side neck armpit part referred to as SNA, the armpit waist part referred to as AW, the waist gluteal fold part referred to as WGF, by the side neck point, bottom armpit point and waist circumference line.

The back neck top point is an intersection point of the back neck and the central bottom cavity of the skull. The front neck top point is an intersection point of the chin and the neck. The side neck point is an intersection point of the side surface of the neck part and the shoulder ridge line. The back neck point is a protruding point of the seventh cervical vertebra. The front neck concave point is a concave point of the front neck part transiting to the body. The front neck point is a concave point at the middle position of the collar bones. The shoulder point is a point of intersection of the shoulder ridge line and the arm line. The front armpit point is located at the upper position of the front axillary space. The rear armpit point is located at the upper position of the rear axillary space. The bust point is the protruding point of the breast part. The bottom armpit point is located at the bottom surface of the arm and the middle position of the front armpit point and the rear armpit point. The bottom bust point is located at the bottom position of the breast part. The abdominal circumference point is located at the front protruding position of the abdomen part. The hip circumference point is located at a rear protruding point of the hip part. The gluteal fold point is a bottom point of the folded muscle of the hip and parallel to the perineum.

As illustrating in the drawings, step 101, the measured data of the required points are first measured and provided to a computer. The method of forming a three-dimensional electronic mannequin according to the present invention can effectively reduce the required data and increase the measured data of the neck part which is neglected in the past to demonstrate the angle change and muscle transformation of the neck part so that the three-dimensional electronic mannequin can simulate more precisely clothing style close to the real wearing effect on a human being by the display of the computer.

Figure 2:
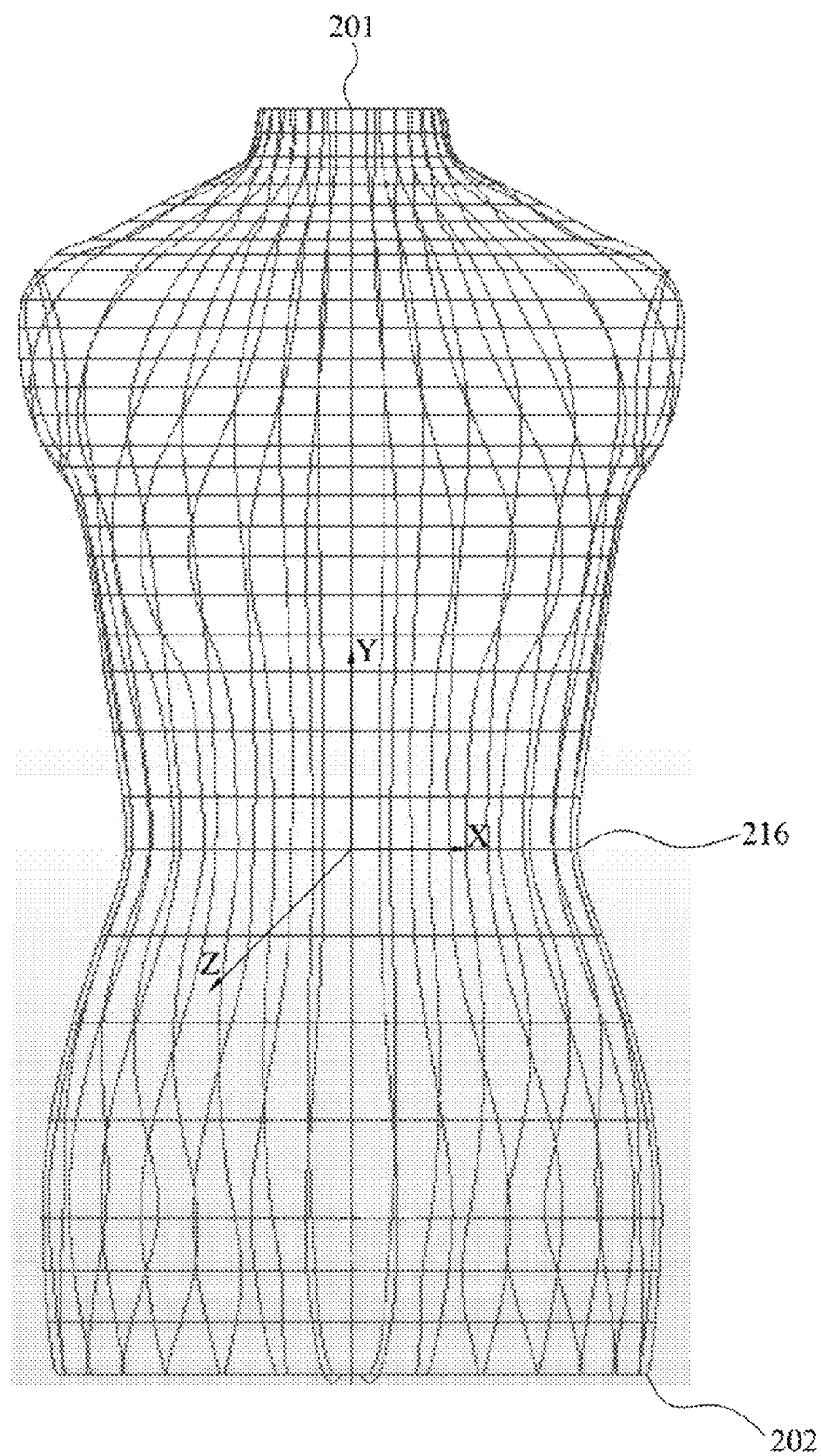
FIG. 2 illustrates a front view of a three-dimensional electronic mannequin according to an embodiment of the present invention.
Figure 3:
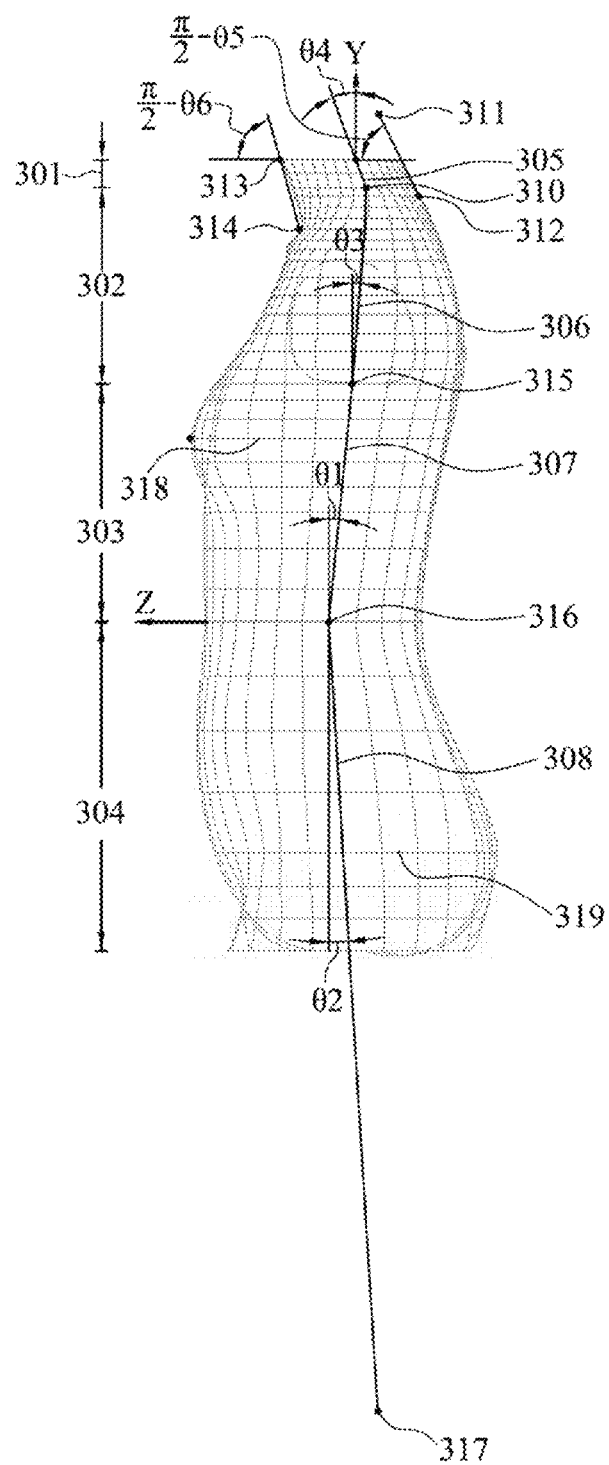
FIG. 3 illustrates a side view of a three-dimensional electronic mannequin according to an embodiment of the present invention.

Referring to FIG. 2 and FIG. 3, from the front neck top point 201 of the neck part to the gluteal fold part 202, the mannequin is divided into 33 circumference lines. The inclination angles of the four human parts, the neck part 301, the side neck armpit part 302, the armpit waist part 303 and the waist gluteal fold part 304, of the mannequin can be calculated with the data of the circumference lines. First, the inclination angles of the four human parts of the mannequin are calculated by a computer or a processor according to the measured data. The inclination angle is an angle between the axis of one part of the mannequin and the Y coordinate axis. The data can be measured by a Martin-type anthropometer, a contour camera and/or a horizontal curvature meter to catch the height of each circumference line, and a front view, a side view, and cross-sectional view of the human body contour. The height is measured from the ground and the circumference line is a horizontal line.

In addition, an original point of the three-dimensional electronic mannequin according to the present invention is defined at a central point of the cross-sectional view of the waist. Y coordinate axis of the three-dimensional electronic mannequin means the height of the three-dimensional electronic mannequin. Above the waist is positive, under is negative. X coordinate axis means the width of the three-dimensional electronic mannequin. The left-hand direction is positive, and the right-hand direction is negative. Therefore, the front direction of the mannequin is positive, the rear direction is negative.

The inclination angles of the four human parts of the three-dimensional electronic mannequin according to the present invention are the angles between the Y coordinate axis and the axes of the neck part 301, the side neck armpit part 302, the armpit waist part 303 and the waist gluteal fold part 304 projected on the YZ plane.

$\theta_4$ represents the inclination angle of the central axis 305 of the neck part 301. The inclination angle $\theta 4$ of the central axis 305 of the neck part 301 is an inclination angle between the Y axis and an angular bisector of a line connecting the back neck top point 311 (N1) and a back neck point 312 (SNA1) and a line connecting the front neck top point 313 (N2) and the front neck concave point 314 (SNA4). The central axis 305 of the neck part 301 is the angular bisector of the two lines and has the same distance to the two lines.

For example, the inclination angle $\theta_4$ of the central axis 305 of the neck part 301 is calculated as follows.

The two lines, one from SNA1 to N1 and the other from SNA4 to N2, are illustrated on the FIG. 3. When we have the coordinate values of the points SNA1, N1, SNA4 and N2, we can calculate the $$N1'\_B = (0, N1\_Y - AW9\_Y, N1\_Z\_B)$$

wherein the N1_Y is the coordinate value of the back neck top point 311 on Y axis measured from the ground, and AW9_Y is the coordinate value of the waist 216 on Y axis measured from the ground. That is to say, the original point is moved to the center of the waist 216. In addition, N1_Z_B is the coordinate value of the back neck top point 311 on Z axis.

It is worth noting that N1' means that the coordinate value on the three-dimensional electronic mannequin, i.e. the origin is located at the central waist point 505 of the waist and N1 means the coordinate value on y axis is measured from the ground, i.e. the coordinate value of the central waist point 505 of the waist on Y axis is AW9_Y. The similar abbreviation in the specification uses the same rule as mentioned above.

$$SNA1'\_B = (0, SNA1\_Y - AW9\_Y, SNA1\_Z\_B)$$

wherein SNA1_Y is the coordinate value of the back neck point 312 on Y axis. In addition, SNA1_Z_B is the coordinate value of the back neck point 312 on Z axis.

$$N2'\_F = (0, N2\_Y - AW9\_Y, N2\_Z\_F)$$

wherein N2_Y is the coordinate value of the front neck top point 313 on Y axis. In addition, N2_Z_F is the coordinate value of the front neck top point 313 on Z axis.

$$SNA4'\_F = (0, SNA4\_Y - AW9\_Y, SNA4\_Z\_F)$$

wherein SNA4_Y is the coordinate value of the front neck concave point 314 on Y axis. In addition, SNA4_Z_F is the coordinate value of the front neck concave point 314 on Z axis.

The points SNA1, N1, SNA4 and N2 are projected on the YZ plane, and the coordinate values thereof can be reduced to as follows.

$$N1'\_B(Y,Z) = (N1\_Y - AW9\_Y, N1\_Z\_B)$$

$$SNA1'\_B(Y,Z) = (SNA1\_Y - AW9\_SNA1\_Z\_B)$$

$$N2'\_F(Y,Z) = (N2\_Y - AW9\_Y, N2\_Z\_F)$$

$$SNA4'\_F(Z) = (SNA4\_Y - AW9\_Y, SNA4\_Z\_F)$$

$$C_{SNA1'\_BN1'\_B\_YZ} = ((N1\_Y - SNA1\_Y)^2 + (N1\_Z\_B - SNA1\_Z\_B)^2)^{1/2}$$

$$\cos(\pi/2 - \theta_5) = |N1\_Z\_B - SNA1\_Z\_B| / C_{SNA1'\_BN1'\_B\_YZ} \Rightarrow \sin\theta_5 = |N1\_Z\_B - SNA1\_Z\_B| / C_{SNA1'\_BN1'\_B\_YZ} \Rightarrow \theta_5 = \sin^{-1}(|N1\_Z\_B - SNA1\_Z\_B| / C_{SNA1'\_BN1'\_B\_YZ})$$

$$C_{SNA4'\_FN2'\_F\_YZ} = ((N2\_Y - SNA4\_Y)^2 + (N2\_Z\_F - SNA4\_Z\_F)^2)^{1/2}$$

$$\cos(\pi/2 - \theta_6) = |N2\_Z\_F - SNA4\_Z\_F| / C_{SNA4'\_FN2'\_F\_YZ} \Rightarrow \sin\theta_6 = |N2Z\_Z\_F - SNA4\_Z\_F| / C_{SNA4'\_FN2'\_F\_YZ} \Rightarrow \theta_6 = \sin^{-1}(|N2\_Z\_F - SNA4\_Z\_F| / C_{SNA4'\_FN2'\_F\_YZ})$$

wherein the $C_{SNA1'\_BN1'\_B\_YZ}$ and $C_{SNA4'\_FN2'\_F\_YZ}$ are the straight line distances between the point SNA1'_BN1'_B(Y, Z) and the point SNA4'_FN2'_F(Y, Z). Therefore, the inclination angel between the central axis of the neck part 305 and the Y axis can be calculated as $$\theta_4 = \frac{1}{2}(\theta_5 + \theta_6) = \frac{1}{2}(\sin^{-1}(|N1\_Z\_B - SNA1\_Z\_B|/C_{SNA1'\_BN1'\_B\_YZ}) +$$
$$\sin^{-1}(|N2\_Z\_F - SNA4\_Z\_F|/C_{SNA4'\_FN2'\_F\_YZ})).$$

Hence, the inclination angle $\theta_4$ of the central axis 305 of the neck part 301 can be calculated.

Further, the step for calculating the inclination angle $\theta_3$ of the central axis 306 of the side neck armpit part 302 of the side neck armpit part 302 is described below. In the three-dimensional electronic mannequin according to the present invention, the central axis 306 of the side neck armpit part 302 starts from the left armpit point 315 to the left neck point 310. The coordinate value of the left armpit point 315 (SNA14'_L) is SNA14'_L.

$$SNA14'\_L=(SNA14\_X\_L, SNA14\_Y-AW9\_Y, SNA14\_Z\_L)$$

The coordinate value of left neck point 310 is N4'_L.

$$N4'\_L=(N4\_X\_L, N4\_Y-AW9\_Y, N4\_Z\_L)$$

The two points are projected on the YZ plane (X=0), and therefore $$SNA14'\_L(Y,Z)=(SNA14\_Y-AW9\_Y, SNA14\_Z\_L)$$

$$N4'\_L(Y,Z)=(N4\_Y-AW9\_Y, N4\_Z\_L).$$

The projected straight line distance of the SNA14'_L and the N4'_L on the Y Z plane is $C_{SNA14'\_LN4'\_L\_YZ}$.

$$C_{SNA14'\_LN4'\_L\_YZ}=((N4\_Y-SNA14\_Y)^2+(N4\_Z\_L-SNA14\_Z\_L)^2)^{1/2}$$

$$\sin\theta_3=|N4\_Z\_L-SNA14\_Z\_L|/C_{SNA14'\_LN4'\_L\_YZ}$$

$$\cos\theta_3=|N4\_Y-SNA14\_Y|/C_{SNA14'\_LN4'\_L\_YZ}$$

Hence, $\theta_3=\sin^{-1}(|N4\_Z\_L-SNA14\_Z\_L|/C_{SNA14'\_LN4'\_L\_YZ})$

Furthermore, an inclination angle $\theta_1$ of the central axis 307 of the armpit waist part 303 of the armpit waist part 303 on the YZ plane is described. The inclination angle $\theta_1$ is an angle between the line from the left waist point 316 to the left armpit point and the Y axis.

As foregoing description mentioned, the coordinate value of the left armpit point 315 of the three-dimensional electronic mannequin according to the present invention is SNA14'_L.

$$SNA14'\_L(SNA14\_X\_L, SNA14\_Y-AW9\_Y, SNA14\_Z\_L)$$

The coordinate value of the left waist point 316 is AW9'_L.

$$AW9'\_L=AW9\_L-AW9\_C=(AW9\_X\_L,0,0)$$

The two points are projected on the YZ plane (X=0), $$AW9'\_L(Y,Z)=(0,0)$$

$$SNA14'\_L(Y,Z)=(SNA14\_Y-AW9\_Y, SNA14\_Z\_L).$$

The projected straight line distance of the SNA14'_L(Y, Z) and the AW9'_L on the Y Z plane is $C_{SNA14'\_L'\_YZ}$.

$$C_{SNA14'\_L'\_YZ}=((SNA14\_Y-AW9\_Y)^2+SNA14\_Z\_L^2)^{1/2}$$

$$\sin\theta_1=|SNA14\_Z\_L|/C_{SNA14'\_L'\_YZ}$$

$$\cos\theta_1=|SNA14\_Y-AW9\_Y|/C_{SNA14'\_L'\_YZ}$$

Hence, $\theta_1=\sin^{-1}(|SNA14\_Z\_L|/C_{SNA14'\_L'\_YZ})$

After that, an inclination angle $\theta_2$ of the central axis 308 of the waist gluteal fold part 304 of the waist gluteal fold part 304 on the YZ plane is calculated. The inclination angle $\theta_2$ of the central axis 308 of the waist gluteal fold part 304 is an angle between the Y axis and the line between the left waist point 316 (AW9'_L) and the left ankle side point 317 (WGF8) that is a point positioned at the smallest circle of the left ankle.

As foregoing description mentioned, the inclination angle $\theta_2$ of the central axis 308 of the waist gluteal fold part 304 can be calculated.

$$\sin\theta_2=|WGF8\_Z\_L|/C_{WGF8'\_L\_YZ}$$

$$C_{WGF8'\_L\_YZ}=((WGF8\_Y-AW9\_Y)^2+WGF8\_Z\_L^2)^{1/2} => \theta_2=\sin^{-1}(|WGF8\_Z\_L|/C_{WGF8'\_L\_YZ})$$

After the foregoing inclination angles are calculated, the method of forming a three-dimensional electronic mannequin according to the present invention can be better than the conventional electronic mannequin by adjusting the human orientation parameters, including the inclination angles, thereof to determine the posture of the three-dimensional electronic mannequin.

After that, referring to step 103, the circumference lines of the method of forming a three-dimensional electronic mannequin according to the present invention are calculated by a computer or a processor.

By way of many times tests and verifications, the meridian lines, e.g. vertical lines, of the three-dimensional electronic mannequin according to the present application are defined by the points on the circumference lines, e.g. parallel lines. Each the circumference line is constituted by same quantity of points thereon. It is worth noting that, on the side view of the circumference lines, bust point and hip part are the most protruding points on the human body, and the slope change of the circumference line on the bust point 401 is higher than the circumference line on the hip part. Therefore, a bust circumference line 407 is adopted to define the required points on the circumference line.

Figure 4:
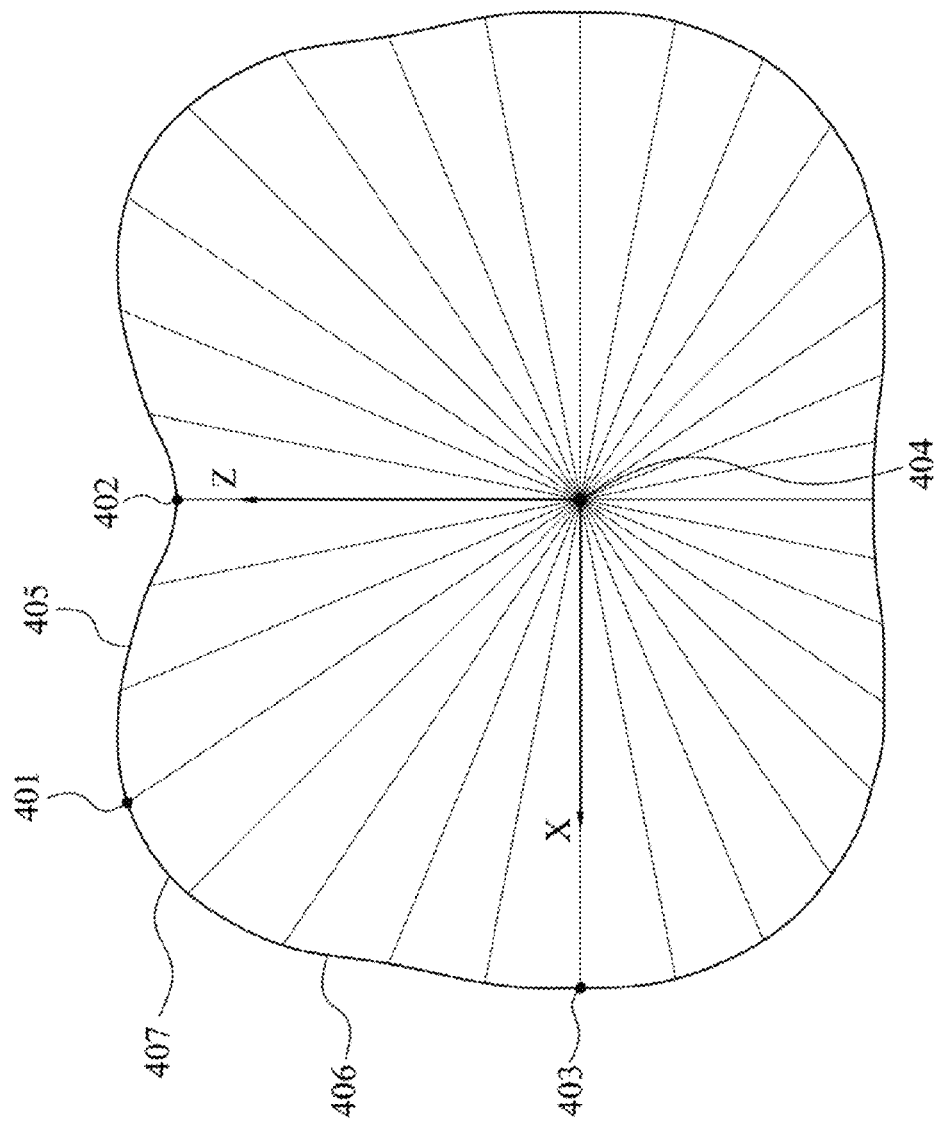
FIG. 4 illustrates how to calculate a bust circumference line using the method of forming the three-dimensional electronic mannequin according to an embodiment of the present invention.

Referring to FIG. 4, the bust circumference line 407 is divided into four parts. Each part of the bust circumference line 407 can be defined into 8 subparts. Further referring to the left and front part of the bust circumference line 407, from the bust point 401 to the front central line 402, a segmental circumference line illustrates an inversed S shape. If the segmental circumference line 405 has only three points cannot completely illustrate the actual curve thereof. Therefore, the segmental circumference line 405 can define four points thereon and the segmental circumference line 405 is divided into three subparts by the four points. In addition, the segmental circumference line 406 is illustrated from the bust point 401 to the left side line 403, and illustrate an S shape, from the bust point 401 to the thoracic wall of the breast part, and an inversed L shape, from the thoracic wall of the breast part to the left side line, and is divided into five subparts and defined 6 points thereon. Therefore, the left and front circumference line can be divided into eight subparts and defined by nine points thereon and the two end points can be shared with the end points of the other segmental circumference line.

In order to simplify the calculation, 9 radial lines are drawn on the left front portion of the three-dimensional electronic mannequin according to the present invention to have 9 intersectional points on the circumference line, and therefore the left front portion of the three-dimensional electronic mannequin according to the present invention is divided into 8 subparts, around 11.25 degrees/per subpart. The entire circumference line is therefore divided into 32 equal subparts. However, the present invention is not limited to 32 equal subparts, and 64 or 96 equal subparts can also be used without departing from the spirit of the invention.

In addition, the bust point 401 can be positioned on the intersectional point of the radial line and the bust circumference line 407, and can also be positioned at the other position on the bust circumference line 407 rather than the intersectional point.

The method of forming a three-dimensional electronic mannequin according to the present invention adopts 32 equal parts on each circumference line can effectively illustrate a suitable human body curve and reduce the required data for a three-dimensional electronic mannequin to allow the three-dimensional electronic mannequin can be is more widely used and economical.

Furthermore, the method of forming a three-dimensional electronic mannequin according to the present invention connects the intersectional points of different circumference line on the same angle to form the meridian lines and therefore 32 meridian lines can be used in the method of forming a three-dimensional electronic mannequin according to the present invention.

Figure 5:
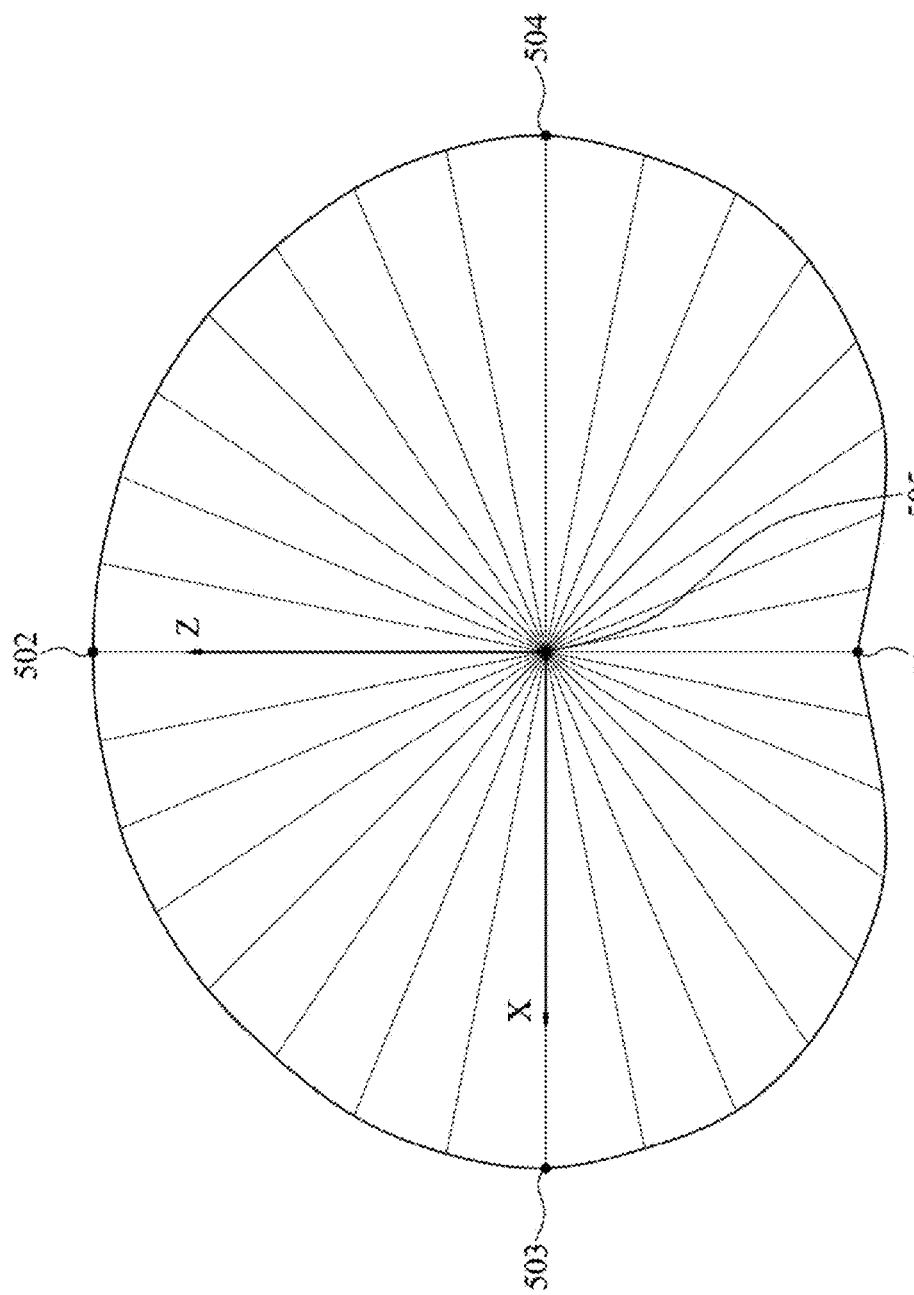
FIG. 5 illustrates how to calculate a waist circumference line using the method of forming the three-dimensional electronic mannequin according to an embodiment of the present invention.

Referring to FIG. 5, the waist circumference line 500 is taken as an example.

(1) Deciding a back waist point 501: The back waist point 501 located at the back side of the waist circumference line 500 is the most recessed point of the back side of the waist circumference line 500.

(2) Deciding a front waist point 502: The front waist point 502 located at the front side of the waist circumference line 500 is the most raised point of the front side of the waist circumference line 500.

(3) Deciding a left waist point 503 and a right waist point 504: The left waist point 503 and the right waist point 504 are located at the furthest left point and the furthest right point of the waist circumference line 500.

(4) Deciding a central waist point 505: The central waist point 505 is located at an intersectional point of the line connecting the front waist point 502 and the back waist point 501 and the line connecting the left waist point 503 and the right waist point 504 and is the origin of the XYZ coordinate system for the method of forming a three-dimensional electronic mannequin according to the present invention.

In addition, the central waist point 505 is the end point for calculating the inclination angles of the armpit waist part 303 and the waist gluteal fold part 304.

Furthermore, the other central point of the circumference line can be calculated to combine the deviation caused by the inclination angle to the central waist point 505.

After the central waist point 505 is calculated, the waist circumference line 500 is divided into 32 equal angle subparts and the length of the 32 radial lines can be further calculated and therefore the coordinate values thereof can also be calculated.

The cross section (AW9_XZ) of the waist (AW9) is taken as an example.

The lengths of radial lines of the cross section (AW9_XZ) of the waist (AW9) are $AW9\_XZ\_L_i$.

$$AW9\_XZ\_L_i, i=1,32;$$

wherein $\alpha_1=0°, \ldots \alpha_9, 90°, \ldots \alpha_{17}=180°, \ldots \alpha_{25}=270° \ldots,$ The coordinate value of each point on the waist (AW9) can be calculated.

$$AW9\_XZ\_Li(X_i, Z_k) = (AW9\_XZ\_L_i \cos\alpha_i, AW9\_XZ\_L_i \sin\alpha_i)$$

$i=1,32.$

In a front view of a standing human, the vertebra is a central line to separate the human body into a left half and a right half. Referring to FIG. 3, in a side view of the standing human, the vertebra shows an S shape and a vertical line is passing through the central point of the waist. The center points of the cross section of the human body above the waist to the neck are located at the rear half of the human body.

The method of forming a three-dimensional electronic mannequin according to the present invention is separated into four human parts, the neck part 301, side neck armpit part 302, armpit waist part 303 and waist gluteal fold part 304 with the side neck point, bottom armpit point and the waist. When the method of forming a three-dimensional electronic mannequin according to the present invention acquires the measured data and inputs to the computer, the inclination angles, the central points of each transversal cross section, and each points on the horizontal circumference line can be calculated. Therefore, a whole body contour can be obtained and the three-dimensional electronic mannequin can be easily adjusted to a required posture.

The measured and calculated data can be converted into the XYZ coordinate values for the method of forming a three-dimensional electronic mannequin according to the present invention.

For example, the measured and calculated data of the central point of the waist is AW9_C.

$$AW9\_C=(0, AW9\_Y, 0)$$

The data of AW9_C is subtracted from the other measured data, then the other measured data can convert into the XYZ coordinate values for the method of forming a three-dimensional electronic mannequin according to the present invention.

For example, the measured data of the left armpit point 315 is SNA14_L.

$$SNA14\_L=(SNA14\_X\_L, SNA14\_Y, SNA14\_Z\_L)$$

Hence, the coordinate value of the left armpit point 315 is SNA14'_L.

$$SNA14'\_L = SNA14\_L - AW9\_C = (SNA14\_X\_L, SNA14\_Y - AW9\_Y, SNA14\_Z\_L)$$

According to the foregoing calculation, all the measured data can be converted into the coordinate values of the XYZ coordinate system for the method of forming a three-dimensional electronic mannequin according to the present invention.

In addition, the coordinate values of the central points are calculated. First, the coordinate value of the central point of the armpit waist part 303 is calculated.

The bust circumference line 407 or the bust circumference line 318 (AW 3) referring to FIG. 3 is taken as an example. The coordinate values of the central point of the bust circumference line 318 (AW 3) is referred to as AW3'_C and can be calculated as follows.

$$AW3'\_C = (0, AW3'\_Y, AW3'\_Z),$$

$$\theta_1 = \sin^{-1}(/SNA14\_Z\_L/ / C_{SNA14'\_L\_YZ})$$

$$\sin\theta_1 = /SNA14\_Z\_L/ / C_{SNA14'\_L\_YZ}$$

$$\cos\theta_1 = /SNA14\_Y - AW9\_Y/ / C_{SNA14'\_L\_YZ}$$

$$\tan\theta_1 = \sin\theta_1 / \cos\theta_1 = (/SNA14\_Z\_L/ / C_{SNA14'\_L\_YZ})/$$

-continued $$(|SNA14\_Y - AW9\_Y|/C_{SNA14'\_L\_YZ}) =$$

$$|SNA14\_Z\_L|/|SNA14\_Y - AW9\_Y|/|SNA14\_Z\_L| =$$

$$|SNA14\_Y - AW9\_Y|/\tan\theta_1/AW3\_Z| = /AW3\_Y -$$

$$AW9\_Y/\tan\theta_1 AW3'\_C = \begin{pmatrix} 0, AW3\_Y - AW9\_Y, - \\ /AW3\_Y - AW9\_Y/\tan\theta_1 \end{pmatrix}$$

The coordinate values of the central point of the waist gluteal fold part 304 can be calculated as follows.

The hip circumference 319 (WGF4) is taken as an example. The coordinate values of the central point of the hip circumference 319 (WGF4) is referred to as WGF4'_C.

$$WGF4'\_C=(0,WGF4'\_Y,WGF4'\_Z)$$

$$\theta_2=\sin^{-1}(|WGF8\_Z\_L|/C_{WGF8'\_L\_YZ})$$

$$C_{WGF8'\_L\_YZ}=((WGF8\_Y-AW9\_Y)^2+WGF8\_Z\_L^2)^{1/2}$$

$$\sin\theta_2=|WGF8\_Z\_L|/C_{WGF8'\_L\_YZ}$$

$$\cos\theta_2=|WGF8\_Y-AW9\_Y|/C_{WGF8'\_L\_YZ}$$

$$\tan\theta_2=\sin\theta_2/\cos\theta_2$$

$$|WGF8\_Z\_L|=|WGF8\_Y-AW9\_Y|\tan\theta_2$$

$$WGF4'\_C=(0,WGF4\_Y-AW9\_Y,-|WGF8\_Y-AW9\_Y|\tan\theta_2)$$

The coordinate values of the central point of the side neck armpit part 302 can be calculated as follows.

The circumference line of the back neck point 312 (SNA1) is taken as an example. The coordinate values of the central point of the circumference line of the back neck point 312 (SNA1) is referred to as SNA1'_C.

$$SNA1'\_C=(0,SNA1'\_Y,SNA1'\_Z)$$

$$C_{SNA14'\_LN4'\_L\_YZ}=((N4\_Y-SNA14\_Y)^2+(N4\_Z\_L-SNA14\_Z\_L)^2)^{1/2}$$

$$\theta_3=\sin^{-1}(|N4\_Z\_L-SNA14\_Z\_L|/C_{SNA14'\_LN4'\_L\_YZ})$$

$$\sin\theta_3=|N4\_Z\_L-SNA14\_Z\_L|/C_{SNA14'\_LN4'\_L\_YZ}$$

$$\cos\theta_3=|N4\_Y-SNA14\_Y|/C_{SNA14'\_LN4'\_L\_YZ}$$

$$\tan\theta_3=\sin\theta_3/\cos\theta_3$$

$$|N4\_Z\_L-SNA14\_Z\_L|=|N4\_Y-SNA14\_Y|\tan\theta_3$$

$$|SNA1\_Z-SNA14\_Z\_L|=|SNA1\_Y-SNA14\_Y|\tan\theta_3$$

$$SNA1'\_C=(0,SNA1\_Y-AW9\_Y,-|SNA1\_Y-SNA14\_Y|\tan\theta_3+SNA14\_Z\_L)$$

The coordinate values of the central point of the neck part can be calculated as follows.

The circumference line of the side neck point (N4) is taken as an example. The coordinate values of the central point of the circumference line of the side neck point (N4) is referred to as N4'_C.

$$N4'\_C=(0,N4\_Y-AW9\_Y,N4\_Z\_L)$$

The circumference line of the front neck top point (N2) is taken as an example. The coordinate values of the central point of the circumference line of the front neck top point (N2) is referred to as N2'_C.

$$N2'\_C=(0,N2'\_Y,N2'\_Z),$$

$$N2'\_Y=N2\_Y-AW9\_Y$$

$$\theta_4=\frac{1}{2}(\theta_5+\theta_6)$$

$$\sin\theta_4=\sin\left(\frac{1}{2}(\theta_5+\theta_6)\right)$$

$$\cos\theta_4=\cos\left(\frac{1}{2}(\theta_5+\theta_6)\right)$$

$$\tan\theta_4=|N2'\_Z|/|N2\_Y-N4\_Y|$$

$$|N2'\_Z|=|N2\_Y-N4\_Y|\tan\theta_4$$

$$N2'\_C=\begin{pmatrix} 0, N2\_Y-AW9\_Y, \\ -|N2\_Y-N4\_Y|\tan\theta_4+N4\_Z\_L \end{pmatrix}$$

As the foregoing description, the points on the circumference lines are correlated with the central points of the central axes according to the method of forming a three-dimensional electronic mannequin. When a user wants to modify one human orientation parameter of the three-dimensional electronic mannequin, the user can only change the required human orientation parameter, e.g. the inclination angle $\theta_4$ of the central axis of the neck part, and the posture of the three-dimensional electronic mannequin can be changed more easily. Accordingly, the designer can more easily use the modified three-dimensional electronic mannequin to make clothing pattern construction.

Referring to step 104 of FIG. 1, a mouse, a keyboard or the equivalent can be utilized to modify at least one human orientation parameter of the three-dimensional electronic mannequin.

Then, step 105, the method of forming the three-dimensional electronic mannequin can quickly and suitably display a modified three-dimensional electronic mannequin on an electronic display to allow the designer designing the clothes and making clothing pattern construction. The method of forming the three-dimensional electronic mannequin according to the present invention can display the modified three-dimensional electronic mannequin on a computer display, and the modified three-dimensional electronic mannequin can also be shown on a three-dimensional projector. In addition, the modified three-dimensional electronic mannequin can also be manufactured by a three-dimensional printer or a three-dimensional machining apparatus to display the modified three-dimensional electronic mannequin.

It is worth noting that when the height according to the method of forming a three-dimensional electronic mannequin is modified, only the one parameter, height, has to be adjusted, and the other data of the circumference line do not need to modify for generating a modified three-dimensional electronic mannequin. The height can be modified on each circumference line or proportionally distributed on every circumference line.

When the thickness or the width has to be modified, the method of forming a three-dimensional electronic mannequin can only modify the thickness or the width of the corresponding point to generate a new three-dimensional electronic mannequin.

In addition, when the cross sectional contour has to be modified, the method of forming a three-dimensional electronic mannequin can only modify the cross sectional contour of the corresponding circumference line to generate a new three-dimensional electronic mannequin.

It is worth noting that when the angle has to be modified, the method of forming a three-dimensional electronic mannequin can only modify one or more inclination angles of the central axis, and the method of forming a three-dimensional electronic mannequin can calculate the coordinate values of the points on the circumference line to generate a new three-dimensional electronic mannequin fulfilled the requirement of the human factors and ergonomics.

Hence, the three-dimensional electronic mannequin according to the present invention can be changed to different postures by changing at least one human orientation parameter. The designer can effectively make clothing pattern construction. In addition, each customer can have her own three-dimensional electronic mannequin by modifying the parameters with the method of forming the three-dimensional electronic mannequin according to the present invention. The customized three-dimensional electronic mannequin can allow the designer to design the clothes fulfill the requirements of the customer. The inclination angles of the four human parts can quickly adjust the posture of the three-dimensional electronic mannequin without too much data input and allow the three-dimensional electronic mannequin more close to a real human and improve the variation and practicability thereof.

In addition, the method of forming the three-dimensional electronic mannequin according to the present invention can be achieved in a computer or an electronic device with the corresponding modules. The three-dimensional electronic mannequin has a measured data module for providing measured data, a mannequin central axis calculating module for calculating mannequin central axes, an inclination angle calculating module for calculating inclination angles of the mannequin central axes, a circumference calculating module for calculating coordinate values of a plurality of points on circumference lines, an adjusting module for adjusting at least one human orientation parameter of the three-dimensional electronic mannequin to form an adjusted three-dimensional electronic mannequin, and an electronic display for displaying the adjusted three-dimensional electronic mannequin. The functions of the foregoing modules are similar to the descriptions of the foregoing steps of the method of forming the three-dimensional electronic mannequin according to the present invention.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A method of forming a three-dimensional electronic mannequin, comprising:
providing measured data;
calculating mannequin central axes;
calculating inclination angles of the mannequin central axes;
calculating coordinate values of a plurality of points on circumference lines;
adjusting at least one human orientation parameter of the three-dimensional electronic mannequin to form an adjusted three-dimensional electronic mannequin; and
displaying the adjusted three-dimensional electronic mannequin on an electronic display, wherein the step of calculating mannequin central axes comprises calculating a central axis of a neck part, calculating a central axis of a side neck armpit part, a central axis of an armpit waist part, and a central axis of a waist gluteal fold part, and the step of calculating inclination angles of the mannequin central axes comprises calculating an inclination angle of the central axis of the neck part, calculating an inclination angle of the central axis of the side neck armpit part, an inclination angle of the central axis of the armpit waist part, and an inclination angle of the central axis of the waist gluteal fold part, wherein the inclination angle of the central axis of the neck part is an inclination angle between the Y axis and an angular bisector of a line starting from a back neck top point to a back neck point and a line starting from a front neck top point to a front neck concave point.

2. The method of forming a three-dimensional electronic mannequin of claim 1, wherein the inclination angle of the central axis of the neck part is $\theta_4$, $$\theta_4 = \frac{1}{2}(\sin^{-1}(|N1\_Z\_B - SNA1\_Z\_B|/C_{SNA1'\_BN1'\_B\_YZ}) + \sin^{-1}(|N2\_Z\_F - SNA4\_Z\_F|/C_{SNA4'\_FN2'\_F\_YZ}))$$

wherein the $N1\_Z\_B$ is a coordinate value on Z-axis of the back neck top point,
the $SNA1\_Z\_B$ is a coordinate value on Z-axis of the back neck point,
the $C_{SNA1'\_BN1'\_B\_YZ}$ is a straight line distances of the back neck top point and the back neck point on YZ plane,
the $N2\_Z\_F$ is a coordinate value on Z-axis of the front neck top point,
the $SNA4\_Z\_F$ is a coordinate value on Z-axis of the front neck concave point, and
the $C_{SNA4'\_FN2'\_F\_YZ}$ is a straight line distances of the front neck top point and the front neck concave point on YZ plane.

3. The method of forming a three-dimensional electronic mannequin of claim 2, wherein the inclination angle of the central axis of the side neck armpit part is $\theta_3$, $$\theta_3 = \sin^{-1}(|N4\_Z\_L - SNA14\_Z\_L|/C_{SNA14'\_LN4'\_L\_YZ})$$

wherein the $N4\_Z\_L$ is a coordinate value on Z-axis of the left neck point,
the $SNA14\_Z\_L$ is a coordinate value on Z-axis of the left armpit point, and
the $C_{SNA14'\_LN4'\_L\_YZ}$ is a straight line distances of the left neck point and the left armpit point on YZ plane.

4. The method of forming a three-dimensional electronic mannequin of claim 3, wherein the inclination angle of the central axis of the armpit waist part is $\theta_1$, $$\theta_1 = \sin^{-1}(|SNA14\_Z\_L|/C_{SNA14'\_L\_YZ})$$

wherein the $SNA14\_Z\_L$ is a coordinate value on Z-axis of the left armpit point, and
the $C_{SNA14'\_L\_YZ}$ is a straight line distances of the left armpit point and the left waist point on YZ plane.

5. The method of forming a three-dimensional electronic mannequin of claim 4, wherein the inclination angle of the central axis of the central axis of the waist gluteal fold part is $\theta_2$, $$\theta_2 = \sin^{-1}(|WGF8\_Z\_L|/C_{WGF8'\_L\_YZ})$$

wherein the $WGF8\_Z\_L$ is a coordinate value on Z-axis of the left ankle side point, and
the $C_{WGF8'\_L\_YZ}$ is a straight line distances of the left ankle side point and the left waist point on YZ plane.

6. The method of forming a three-dimensional electronic mannequin of claim 5, wherein the step of calculating coordinate values of a plurality of points on circumference lines comprises dividing each circumference line into 32 points with an equal angle interval on the circumference line.

7. The method of forming a three-dimensional electronic mannequin of claim 6, wherein the step of adjusting at least one human orientation parameter of the three-dimensional electronic mannequin to form an adjusted three-dimensional electronic mannequin comprises adjusting at least one of the inclination angles of the mannequin central axes, a height, a thickness, a width and a sectional circumference of the three-dimensional electronic mannequin.

* * * * *